(12) United States Patent
Bridge et al.

(10) Patent No.: US 6,881,111 B2
(45) Date of Patent: Apr. 19, 2005

(54) SHAFT COUPLER WITH POSITIVE ANGULAR AND AXIAL LOCKING FEATURES FOR COUPLING PADDLE SECTIONS TOGETHER AND ANGULARLY POSITIONING THE SECTIONS RELATIVE TO EACH OTHER

(75) Inventors: Andrew Richard Bridge, Sultan, WA (US); Jon W. Stamm, Renton, WA (US)

(73) Assignee: Werner Paddles, Sultan, WA (US)

( * ) Notice: Subject to any disclaimer, the term of this patent is extended or adjusted under 35 U.S.C. 154(b) by 0 days.

(21) Appl. No.: 10/631,114

(22) Filed: Jul. 30, 2003

(65) Prior Publication Data

US 2004/0023570 A1 Feb. 5, 2004

Related U.S. Application Data

(60) Provisional application No. 60/399,932, filed on Jul. 30, 2002.

(51) Int. Cl.[7] .............................................. B63H 16/04
(52) U.S. Cl. ....................... 440/101; 440/102; 403/355
(58) Field of Search ................................ 440/101, 102; 403/359, 97, 101, 371, 381, 355, 348, 298, 46, 84

(56) References Cited

U.S. PATENT DOCUMENTS

| | | | | |
|---|---|---|---|---|
| 1,307,160 A | * | 6/1919 | Stokes | 403/97 |
| 2,376,714 A | * | 5/1945 | Mussen | 15/250.34 |
| 3,144,909 A | * | 8/1964 | Hart et al. | 403/355 |
| 4,820,216 A | * | 4/1989 | Masters | 440/101 |
| 5,409,324 A | * | 4/1995 | Johnson, Jr. | 403/355 |
| 5,791,804 A | * | 8/1998 | Cheng | 403/97 |
| 5,842,830 A | | 12/1998 | Franznick | |
| 6,022,255 A | | 2/2000 | Lukanovich | |
| 6,086,284 A | * | 7/2000 | Callahan | 403/93 |
| 6,328,617 B1 | | 12/2001 | Gunnell | |
| 6,419,601 B1 | | 7/2002 | Kenner | |
| 2001/0053641 A1 | | 12/2001 | Hendrik | |

* cited by examiner

*Primary Examiner*—Stephen Avila
(74) *Attorney, Agent, or Firm*—Graybeal Jackson Haley LLP

(57) ABSTRACT

The present invention provides a coupler for rotationally and/or axially securing two shafts together while permitting rapid angular adjustment between the shafts. The coupler includes a first component mountable to a first section of the paddle and a second component mountable to a second section of the paddle. The first component includes a receptacle, and the second component includes a protrusion operable to extend into the receptacle to position the first component relative to the second component and to prevent the first component from turning relative to the second component. To turn and reposition one of the components relative to the other component, the second component is axially movable relative to the first component. The coupler may also include a retainer to prevent the first component from inadvertently being repositioned relative to the second component.

24 Claims, 4 Drawing Sheets

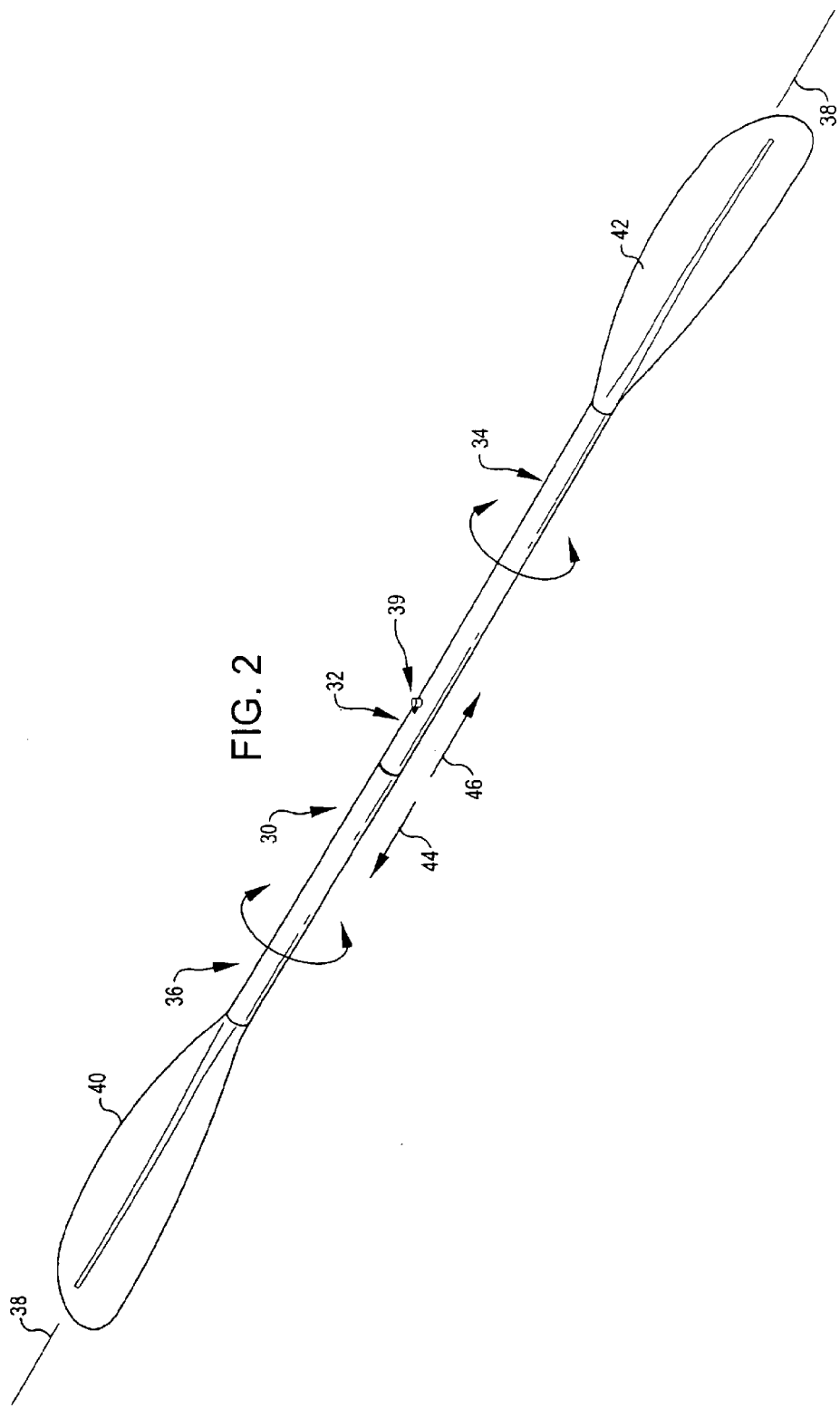

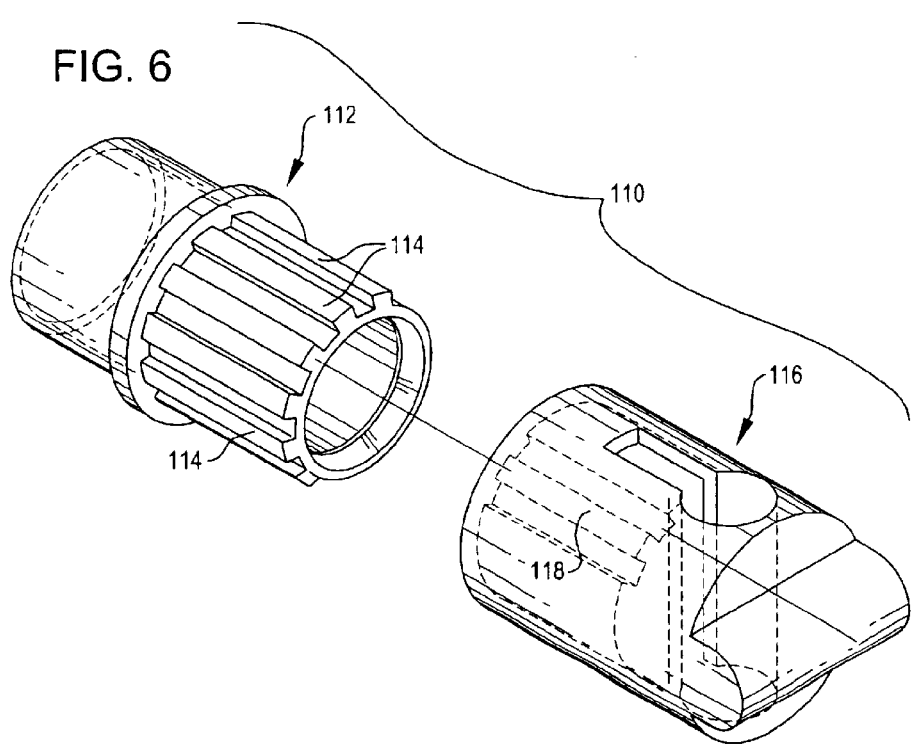

SHAFT COUPLER WITH POSITIVE ANGULAR AND AXIAL LOCKING FEATURES FOR COUPLING PADDLE SECTIONS TOGETHER AND ANGULARLY POSITIONING THE SECTIONS RELATIVE TO EACH OTHER

CROSS-REFERENCE TO RELATED APPLICATIONS

This application claims priority from commonly owned U.S. Provisional Patent Application No. 60/399,932, filed Jul. 30, 2002, titled Ferrule For Connecting Portions Of A Paddle Together And For Adjusting The Feather Of A Double-Bladed Paddle, presently pending, which is hereby incorporated by reference in its entirety.

BACKGROUND

When kayaking on a river, lake or ocean, many kayakers propel themselves with a double-bladed paddle. Due to the rotation of one's torso combined with raised hands during a forward stroke it is necessary to feather the kayak paddle. In addition kayakers often encounter windy conditions when kayaking—especially on a large lake or an ocean, a kayaker's paddle is often feathered to reduce the wind drag of the paddle blade not in the water. Feather is the angular relationship of the plane of one paddle blade relative to the plane of the other paddle blade and is often expressed as the angle between the planes. Feathering a paddle alleviates potential stress on the wrists, which may be significant over a long excursion. Because kayakers use a variety of paddling styles, a paddle whose feather may be adjusted allows a kayaker to modify his/her paddle to match his/her style and conditions.

There are many conventional coupling arrangements available that allow one to adjust the feather of a paddle. An example of a conventional coupling arrangement is shown in FIG. 1 and includes a collet 10 to frictionally couple shaft sections of a paddle with each other. As shown in FIG. 1, the collet 10 includes a collar 12 mounted to a shaft 14, and a compression nut 16 that slides along the shaft 18. When the collar 12 is engaged with the compression nut 16, the shaft 18 is frictionally prevented from moving relative to the shaft 14 due to constriction of the collar 12 around the shaft 18.

Unfortunately, the collet 10 has some problems. One of the problems is that the collet 10 frequently does not securely couple the shafts 14 and 18 with each other. Because the collet 10 frictionally couples the shaft 18 with the shaft 14, twisting and/or pulling the shaft 14 relative to the shaft 18 can cause a loss of desired feather in the paddle and can cause the shafts to separate. To more securely couple the shafts 14 and 18 with each other, one may increase the constricting force on the collar 12 by threading the compression nut 16 further along the collar 12 with much force. But this induces undesired stress in the collet 10 and the shaft 18, which typically causes the collet 10 to wear out prematurely. Furthermore, the compression nut 16 may become stuck with the collar 12 and make uncoupling the shafts 14 and 18 to adjust the feather of a paddle difficult.

Another example of a conventional coupling arrangement is a button (not shown) that protrudes from a first shaft of one paddle section into a hole (not shown) in a second shaft of another paddle section. To provide different indexed positions, and thus different feather angles, more than one hole is located about the circumference in the second shaft. The button typically travels in a radial direction or perpendicular to the longitudinal axis of each shaft and is biased away from each shaft's longitudinal axis by a spring; the hole is typically sized to closely receive the button. Once inserted into the hole, the button prevents the shafts from rotating relative to each other and may further prevent the paddle sections from being pulled apart as one uses the paddle.

Unfortunately, this type of coupling arrangement also has some problems. The number of different indexed positions is limited to the number of holes the shaft can include without causing the shaft to buckle or permanently deform under the strain of use. In addition, the holes in the shaft or the button often deform from the force imposed by the respective button, or shaft over prolonged use. This causes the feather of the paddle associated with a specific indexed position to change over time and introduces play or undesirable movement between the paddle sections when the sections are connected to each other. This undesirable play in turn hastens further deformation of the hole and the eventual permanent deformation or failure of the paddle.

SUMMARY

The present invention provides a coupler for rotationally and/or axially securing two shafts together while permitting rapid angular adjustment between the shafts. For example, in a double-bladed paddle the coupler releasably couples a shaft of a first section of a paddle that includes a paddle blade with a shaft of a second section that also includes a paddle blade. In such a double-bladed paddle, the coupler allows one to change the relative angular position of the two shafts among many different and consistent positions and then more securely couples the sections together in each position to adjust and retain a desired feather of the paddle.

The coupler includes a first component mountable to a first section of the paddle and a second component mountable to a second section of the paddle. The first component includes a receptacle, and the second component includes a protrusion operable to extend into the receptacle to position the first component relative to the second component and to prevent the first component from turning relative to the second component. To turn and reposition one of the components relative to the other component, the second component is movable relative to the first component along the paddle axis.

In one embodiment, the second component includes 24 protrusions each including a rectangular key, and the first component includes 24 receptacles each including a keyway sized to receive each key. In such an embodiment, each key and corresponding keyway prevent the first component from turning relative to the second component in each angular position of the first component. Thus, the coupler spreads the bearing force generated in the coupler over many keys and keyways. Consequently, the coupler may provide more angular positions for the first component relative to the second component and thus greater feather adjustment. Furthermore, over prolonged use, the coupler may couple the sections of a paddle at the same or substantially the same designed angular position and with minimal play between the sections. Thus, the coupler may provide more consistent paddle feathers over prolonged use.

In another embodiment, the coupler may also include a retainer to prevent the first component from inadvertently being repositioned relative to the second component. The retainer may be mounted to the first component and may include a hook that can receive a lip of the second component to releasably lock the first component with the second component by preventing the movement of the first component relative to the second component along the paddle axis. The retainer may also include a spring to bias the hook toward the lip when the protrusion of the second component extends into the receptacle of the first component.

BRIEF DESCRIPTION OF THE FIGURES

FIG. 2 is a perspective view of a double-bladed paddle that incorporates a coupler, according to an embodiment of the invention.

FIG. 6 is an exploded, perspective view of a coupler according to yet another embodiment of the invention.

DETAILED DESCRIPTION

Figure 1:
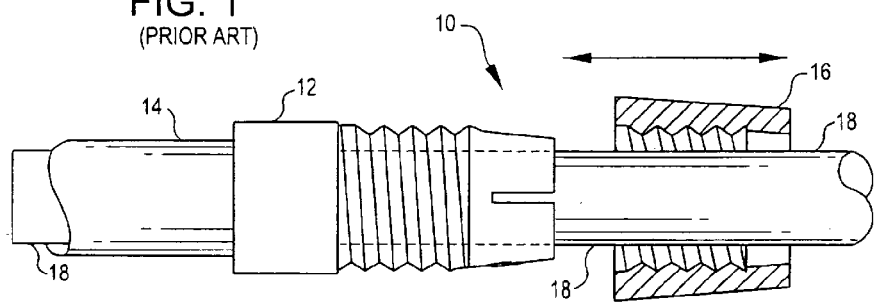
FIG. 1 is a cross-sectional view of a conventional coupler.

The following discussion is presented to enable one skilled in the art to make and use the invention. Various modifications to the disclosed embodiments will be readily apparent to those skilled in the art, and the generic principles herein may be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein.

FIG. 2 is a perspective view of a paddle 30 that incorporates a coupler 32, according to an embodiment of the invention. The coupler 32 (shown and discussed in greater detail in conjunction with FIGS. 3–6) angularly positions the sections 34 and 36 of the paddle 30 relative to each other about a paddle axis 38, and releasably couples the sections 34 and 36 with each other in an established angular position. The coupler 32 may also include a retainer 39 (shown and discussed in greater detail in conjunction with FIGS. 3 and 4) to lock the sections 34 and 36 in the established, relative angular positions. As shown, the paddle 30 is a double-bladed paddle that includes a first section 34 having a blade 40 and a second section 36 having a blade 42. By angularly positioning the sections 34 and 36 relative to each other about the paddle axis 38, one may adjust the paddle's feather as desired, for example to match currently existing wind conditions.

The coupler 32 may angularly position the sections 34 and 36 relative to each other about the paddle axis 38 among different angular positions as desired. The different angular positions may be equally, angularly spaced through 360° or any portion of 360°, such as 90°, 180° or 135°. For example, in one embodiment, the coupler 32 may releasably couple the sections 34 and 36 together at 24 different angular positions about the paddle axis 38 that are angularly spaced 15° or substantially 15° between adjacent angular positions. This may be desirable to provide a broad range of feather angles with moderate angular spacing between adjacent feather angles. In another embodiment, the coupler 32 may releasably couple the sections 34 and 36 together at 24 different angular positions that are spaced 5° or substantially 5° between adjacent angular positions. In such an embodiment, the feather of the paddle 30 may range from 0° to 120° and may be desirable to provide a narrower range of feather angles with less angular spacing between adjacent feather angles. In still another embodiment, the coupler 32 may releasably couple the sections 34 and 36 together at 10 different angular positions that are unequally spaced between adjacent angular positions. This may be desirable to provide small angular spacing between adjacent angular positions within a popular range of feather angles and larger angular spacing between adjacent angular positions within a less popular range of feather angles.

With the coupler 32, one may quickly and easily change the angular position of the sections 34 and 36 relative to each other about the paddle axis 38 to change the feather of the paddle 30. In one embodiment, one first unlocks the coupler 32 to uncouple the sections 34 and 36 from each other by pushing the retainer 39 toward the paddle axis 38. Next, one moves the section 36 in a direction 44 away from the section 34 along the paddle axis 38 to uncouple the sections 34 and 36. Next, one turns the section 36 relative to the section 34 about the paddle axis 38 to reposition the section 36 relative to the section 34 at a different angular position. Next, one moves the section 36 in a direction 46 toward the section 34 along the paddle axis 38 to couple the sections 34 and 36 together and to lock the sections 34 and 36 in the new established angular position.

Other embodiments of the paddle 30 that incorporate the coupler 32 are contemplated. For example, the paddle 30 may be a single bladed paddle with one of the sections 34 and 36 having a handle instead of another blade. In addition, unlocking the coupler 32 may include moving the retainer 39 along the paddle axis 38 and/or turning the retainer 39 about the paddle axis 38. Also, uncoupling the sections 34 and 36 may include moving the section 36 toward the section 34 along the paddle axis 38, and coupling the section 36 with the section 34 may include moving the section 36 away from the section 34 along the paddle axis 38.

Figure 3:
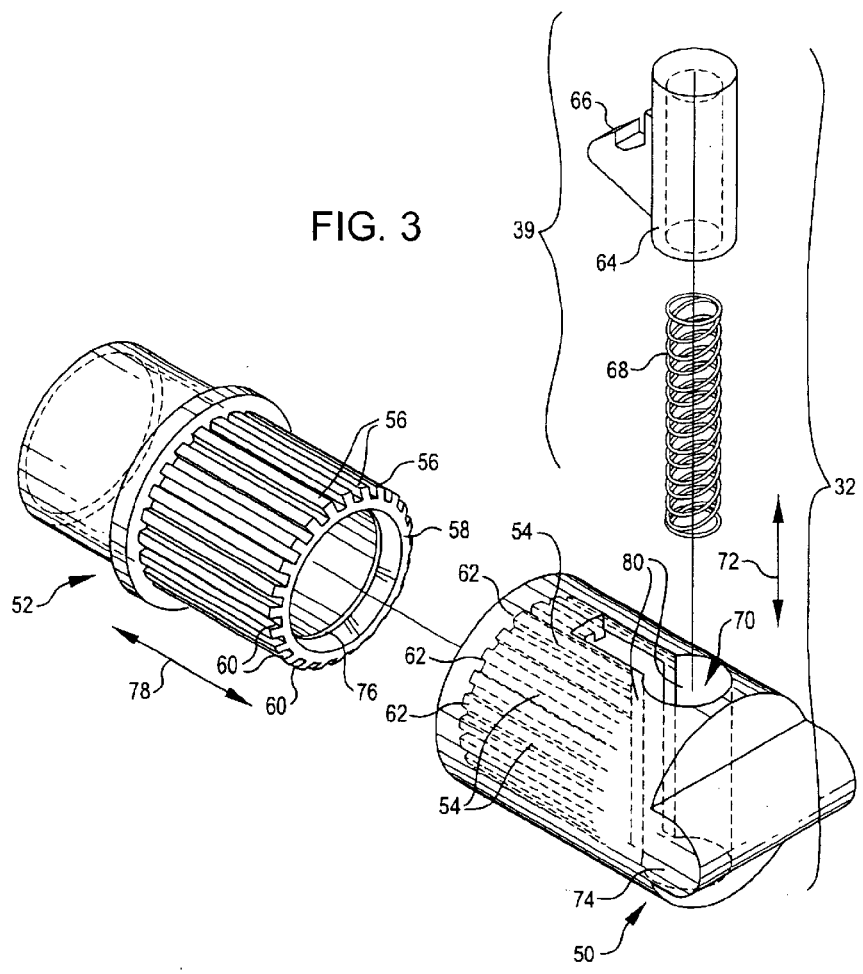
FIG. 3 is an exploded, perspective view of the coupler in FIG. 2 according to an embodiment of the invention.

FIG. 3 is an exploded, perspective view of the coupler 32 in FIG. 2 according to an embodiment of the invention. The coupler 32 releasably couples the sections 34 and 36 (FIG. 2) together more securely in different angular positions about the paddles axis 38 (FIG. 2). Furthermore, the coupler 32 maintains the designed feather angle among different angular positions over prolonged use.

The coupler 32 includes a first component 50 mountable to the section 34 of the paddle 30, and a second component 52 mountable to the section 36 of the paddle 30. The first component 50 includes a receptacle 54, and the second component 52 includes a protrusion 56 that extends into the receptacle 54 when the first component 50 is coupled with the second component 52. By extending into the receptacle 54, the protrusion 56 and receptacle 54 angularly position the first component 50 relative to the second component 52 and prevent the first component 50 from turning relative to the second component 52.

Still referring to FIG. 3, the first component 50 may include one or more receptacles 54 and the second component 52 may include one or more protrusions 56. Furthermore, the protrusions 56 and the receptacles 54 may have any desired form. For example in one embodiment, the second component 52 may include a perimeter 58 from which 24 protrusions 56 extend, and the first component 50 may include 24 receptacles 54. Each protrusion 56 may include a rectangular key 60, and each receptacle 54 may include a rectangular keyway 62 sized to receive each key 60. When each key 60 extends into a respective keyway 62, the first component 50 is angularly positioned relative to the second component in one of 24 angular positions and is prevented from turning relative to the second component 52 by the 24 keys 60 and keyways 62. Thus, the force required to keep the first component 54 in an angular position relative to the second component may be distributed throughout the perimeter 58. Furthermore, holding an angular position of the first component 50 relative to the second component does not require friction between the two components 50 and 52. Consequently, the angular position of the first component 50 relative to the second component 52 is less likely to inadvertently change when subjected to severe loads, and the different angular positions of the first component 50 relative to the second component 52 may remain consistent over prolonged use.

Other embodiments are contemplated. For example, the first component 50 may include the protrusion 56 and the second component 52 may include the receptacle 54. Also, as shown and discussed in conjunction with FIG. 5, the second component 52 may include one protrusion 56 and the first component 50 may include two or more receptacles 54. Or, as shown and discussed in conjunction with FIG. 6, the second component 52 may include two or more protrusions 56, and the first component 50 may include one receptacle 54. Furthermore, the protrusion 56 and the receptacle 54 may include forms other than the rectangular key 60 and keyway 62, respectively, such as a trapezoidal key and keyway.

Still referring to FIG. 3, the coupler 32 may include a retainer 39 to lock the angular position of the first component 50 relative to the second component 52 when the first and second components 50 and 52 are coupled with each other. In one embodiment, the retainer 39 may include a body 64, a hook 66 that extends from the body 64 and a spring 68 to bias the retainer 39 toward a lock position (shown and discussed in greater detail in conjunction with FIG. 4). The body 64 may be disposed in the hole 70 of the first component 50 and allowed to move in the direction 72 within the hole 70 to locate the retainer 39 in the locked or unlocked position. The spring 68 may be compressed between the body 64 and the bottom 74 of the hole 70 and may urge the retainer 39 toward the lock position. When the retainer 39 locks the first component 50 with the second component 52, the hook 66 receives a portion of the lip 76 of the first component 50 and prevents the lip 76 from moving in the direction 78 relative to the hook 66, and the wall 80 of the hole 70 prevents the body 64 from moving in the direction 78 relative to the first component 50. Thus, the retainer 39 locks the angular position of the first component 50 relative to the second component 52 by preventing the first component 50 from moving in the direction 78 relative to the second component 52.

Other embodiments are contemplated. For example, the spring 68 may be a solid plug of urethane that resists compression. In addition, the second component 52 may include a retainer 39 that may be a pin having a longitudinal axis that extends away from the perimeter 58 and that may be located at the end of a cantilevered leaf spring of the second component 52. To lock the angular position of the first component 50 relative to the second component 52, the leaf spring may insert the pin into a hole in the corresponding component. Furthermore, the first component 50 may include the pin and cantilevered leaf spring and the second component 52 may include the hole.

Still referring to FIG. 3, the coupler 32 may be made of any desirable material capable of withstanding the environment the coupler will function in, such as salt water or fresh water. For example, in one embodiment, the first and second components 50 and 52 may be made of polycarbonate; the body 64 and hook 66 may also be made of polycarbonate; and the spring 68 may be made of AISI Type 316 stainless steel.

Figure 4:
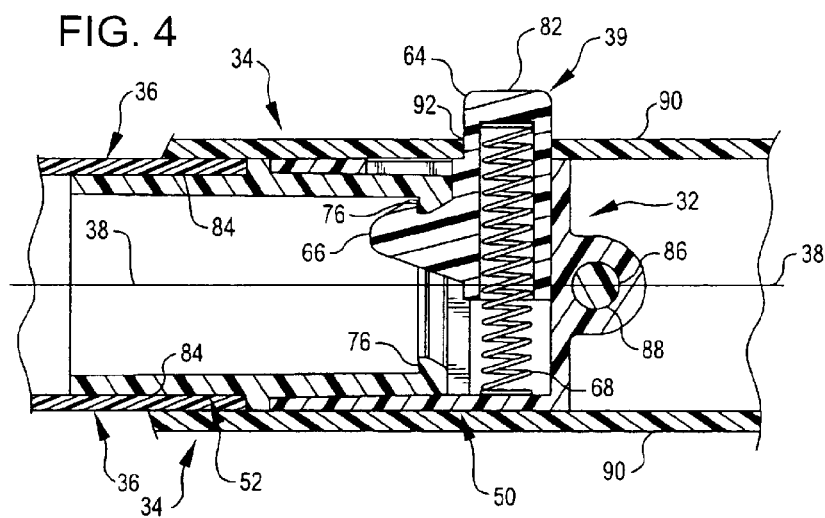
FIG. 4 is a cross-sectional view of the coupler in FIG. 3 showing a first component of the coupler locked in an angular position relative to a second component of the coupler.

FIG. 4 is a cross-sectional view of the coupler in FIG. 3 showing the first component 50 of the coupler 32 locked in an angular position relative to the second component 52 of the coupler 32. FIG. 4 also shows the first component 50 of the coupler 32 mounted to the section 34 of the paddle 30 (FIG. 2), and the second component 52 mounted to the section 36.

As shown in FIG. 4, the retainer 39 locks the angular position of the first component 50 relative to the second component 52 by preventing the first component 50 from moving away from the second component 52 along the paddle axis 38. Consequently, the one or more protrusions 56 (FIG. 3) of the second component 52 are kept in the one or more respective receptacles 54 (FIG. 3) of the first component 50. In one embodiment, when the hook 66 is in the locked position, the hook 66 may hold a portion of the lip 76 to prevent the lip 76 from moving in a direction along the paddle axis 38. The spring 68 may urge the hook 66 toward the lip 76 to prevent the hook 66 from inadvertently moving away from the lip 76, and thus, inadvertently releasing the hook's hold on the portion of the lip 76. When the hook 66 is in the unlocked position, the hook 66 may be located away from the portion of the lip 76 to release the hook's hold on the lip's portion and allow the lip 76, and thus, the second component 52, to move away from the first component 50 along the paddle axis 38. To unlock the angular position of the first component 50 relative to the second component 52, one may exert pressure on the top 82 of the retainer's body 64 to move the hook 66 away from the portion of the lip 76. When the pressure on the top 82 is removed, the spring may urge the hook 66 back toward the locked position, where the hook 66 may again hold a portion of the lip 76, if a portion of the lip 76 is so located.

Still referring to FIG. 4, the coupler 32 may be mounted to the sections 34 and 36 of the paddle 30 using any desired technique capable of withstanding the loads and environment the paddle 30 may experience during use. For example, in one embodiment, the second component 52 of the coupler 30 may be mounted to a second section 36 of the paddle 30 with any desired adhesive at the interface 84. The first component 50 of the coupler 32 may be releasably mounted to a first section 36 with a pin 86 that may extend through a hole 88 in the first component 50 and two holes (not shown) in the body 90 of the section 34. To access the retainer 39 to unlock the angular position of the first component 50 relative to the second component 52, the top 82 of the retainer's body 64 may extend through a hole 92 in the paddles section's body 90.

Figure 5:
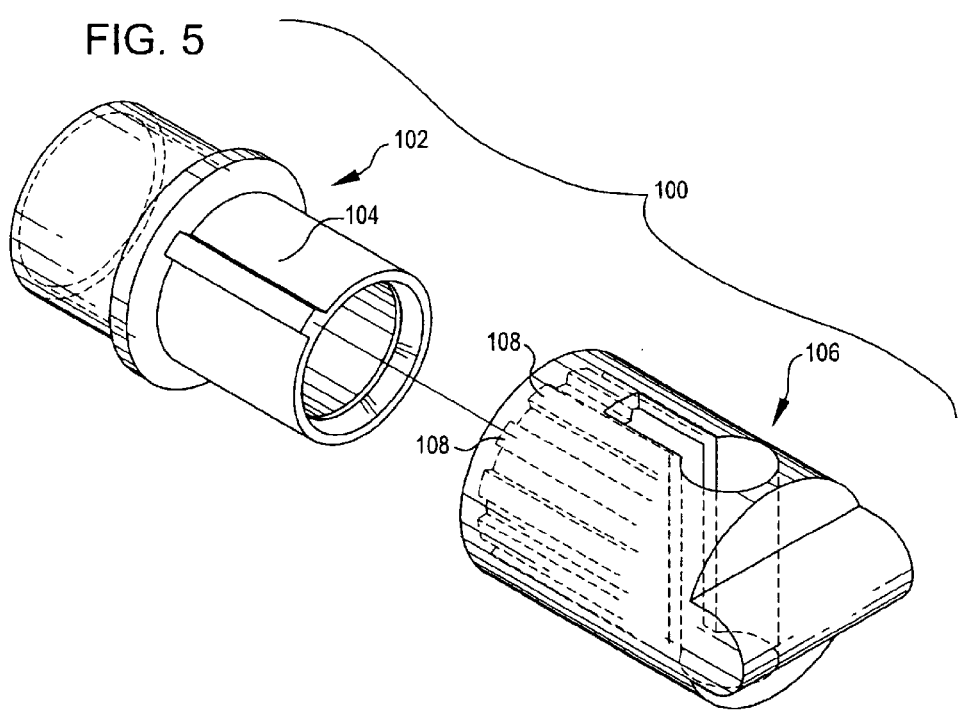
FIG. 5 is an exploded, perspective view of a coupler according to another embodiment of the invention.

FIG. 5 is an exploded, perspective view of a coupler 100 according to another embodiment of the invention. The coupler 100 is similar to the coupler 32 in FIGS. 3 and 4 except the second component 102 includes one protrusion 104, and the first component 106 includes at least two receptacles 108. The coupler 100 may be desirable to withstand frequent, prolonged adjustments of the angular position of the first component 106 relative to the second component 102 when the angular spacing between adjacent angular positions may be moderate or large.

FIG. 6 is an exploded, perspective view of a coupler 110 according to yet another embodiment of the invention. The coupler 110 is similar to the coupler 32 in FIGS. 3 and 4 except the second component 112 includes at least two protrusions 114, and the first component 116 includes one receptacle 118. The coupler 110, like the coupler 100 of FIG. 5, may be desirable to withstand frequent, prolonged adjustments of the angular position of the first component 116 relative to the second component 112 when the angular spacing between adjacent angular positions may be moderate or large.

What is claimed is:

1. A coupler for coupling sections of a paddle together and angularly positioning the sections relative to each other about a paddle axis, the coupler comprising:
    a first component mountable to a first section of the paddle and including a receptacle;
    a second component mountable to a second section of the paddle and including a protrusion operable to extend into the receptacle of the first component to position the first component relative to the second component and to prevent the first component from turning relative to the second component, wherein the second component is movable relative to the first component along the paddle axis to turn and reposition the first component relative to the second component; and
    a retainer having a hook operable to receive the second component to releasably lock the position of the second component relative to the first component.

2. The coupler of claim 1 wherein the first component includes more than one receptacle each operable to receive the protrusion of the second component to position the first component in different angular positions relative to the second component.

3. The coupler of claim 1 wherein the second component includes more than one protrusion each operable to extend into the receptacle of the first component to position the first component in different angular positions relative to the second component.

4. The coupler of claim 1 wherein:
    the first component includes more than one receptacle, and
    the second component includes more than one protrusion each operable to extend into each receptacle to position the first component relative to the second component in different angular positions.

5. The coupler of claim 1 wherein the second component is movable relative to the first component along the paddle axis to withdraw the protrusion of the second component from the receptacle of the first component.

6. The coupler of claim 1 wherein:
    the protrusion includes a rectangular key, and
    the receptacle includes a keyway sized to receive the key.

7. The coupler of claim 1 wherein:
    the second component includes 24 protrusions, each including a rectangular key, and
    the first component includes 24 receptacles, each including a keyway sized to receive each key.

8. The coupler of claim 7 wherein:
    each protrusion is equally, angularly spaced around a perimeter of the second component, and
    each receptacle receives a protrusion when the first component is positioned relative to the second component.

9. The coupler of claim 1 wherein:
    the second component includes a lip, and
    the retainer includes a hook operable to releasably lock the lip with the first component.

10. The coupler of claim 9 wherein the retainer includes a spring to bias the hook toward the lip when the protrusion of the second component extends into the receptacle of the first component.

11. A paddle comprising:
    a first section;
    a second section angularly positionable relative to the first section about a paddle axis; and
    a coupler operable to couple the first section with the second section, wherein the coupler comprises:
        a first component included in the first section of the paddle and including a receptacle, and
        a second component included in the second section of the paddle and including a protrusion operable to extend into the receptacle of the first component to position the second section relative to the first section and to prevent the second section from turning relative to the first section, wherein the second component is movable relative to the first component along the paddle axis to turn and reposition the second section relative to the first section.

12. The paddle of claim 11 wherein the first component is mounted to the first section, and the second component is mounted to the second section.

13. The paddle of claim 11 wherein the paddle is a double-bladed paddle and the first section includes a first blade and the second section includes a second blade.

14. The paddle of claim 11 wherein the first section includes a handle and the second section includes a blade.

15. The paddle of claim 11 wherein:
    the first section includes a body, and
    the first component of the coupler is releasably mounted to the body.

16. The paddle of claim 15 wherein a pin releasably mounts the first component to the body.

17. The paddle of claim 11 wherein:
    the second component of the coupler includes 24 protrusions, each equally, angularly spaced around a perimeter and each including a rectangular key; and
    the first component of the coupler includes 24 receptacles, each including a keyway sized to receive each key to position the second component relative to the first component in 24 different angular positions.

18. The paddle of claim 11 wherein the coupler includes a retainer operable to releasably couple the first component with the second component to lock the position of the first component relative to the second component.

19. A method for coupling sections of a paddle together and positioning the sections relative to each other about a paddle axis, the method comprising:
    inserting a protrusion of a second component of a coupler of a paddle into a receptacle of a first component of the coupler to position the first component relative to the second component and to prevent the first component from turning relative to the second component; and
    locking the position of the first component relative to the second component with a retainer.

20. The method of claim 19 wherein inserting the protrusion into the receptacle includes inserting a rectangular key of the second component into a keyway of the first component.

21. The method of claim 19 wherein locking the position of the first component relative to the second component includes retaining a lip of the second component with a hook of the retainer.

22. The method of claim 19 further comprising:
    moving the first component relative to the second component along the paddle axis to withdraw the protrusion from the receptacle; and turning the first component relative to the second component about the paddle axis to reposition the first component relative to the second component.

23. A paddle comprising:

a first section;

a second section angularly positionable relative to the first section about a paddle axis; and a coupler operable to couple the first section with the second section, wherein the coupler comprises:
- a first component included in the first section of the paddle and including a receptacle,
- a second component included in the second section of the paddle and including a protrusion operable to extend into the receptacle of the first component to position the second section relative to the first section and to prevent the second section from turning relative to the first section, wherein the second component is movable relative to the first component along the paddle axis to turn and reposition the second section relative to the first section,
- a retainer having a hook operable to receive the second component to releasably lock the position of the second component relative to the first component.

24. A method for coupling sections of a paddle together and positioning the sections relative to each other about a paddle axis, the method comprising:

inserting a protrusion of a second component of a coupler of a paddle into a receptacle of a first component of the coupler to position the first component relative to the second component and to prevent the first component from turning relative to the second component; and locking the position of the second component relative to the first component with a hook of the retainer.

* * * * *